C. G. WOOD AND J. M. WILSON.
SPOT FACING MACHINE.
APPLICATION FILED AUG. 26, 1918.
1,318,039.
Patented Oct. 7, 1919.
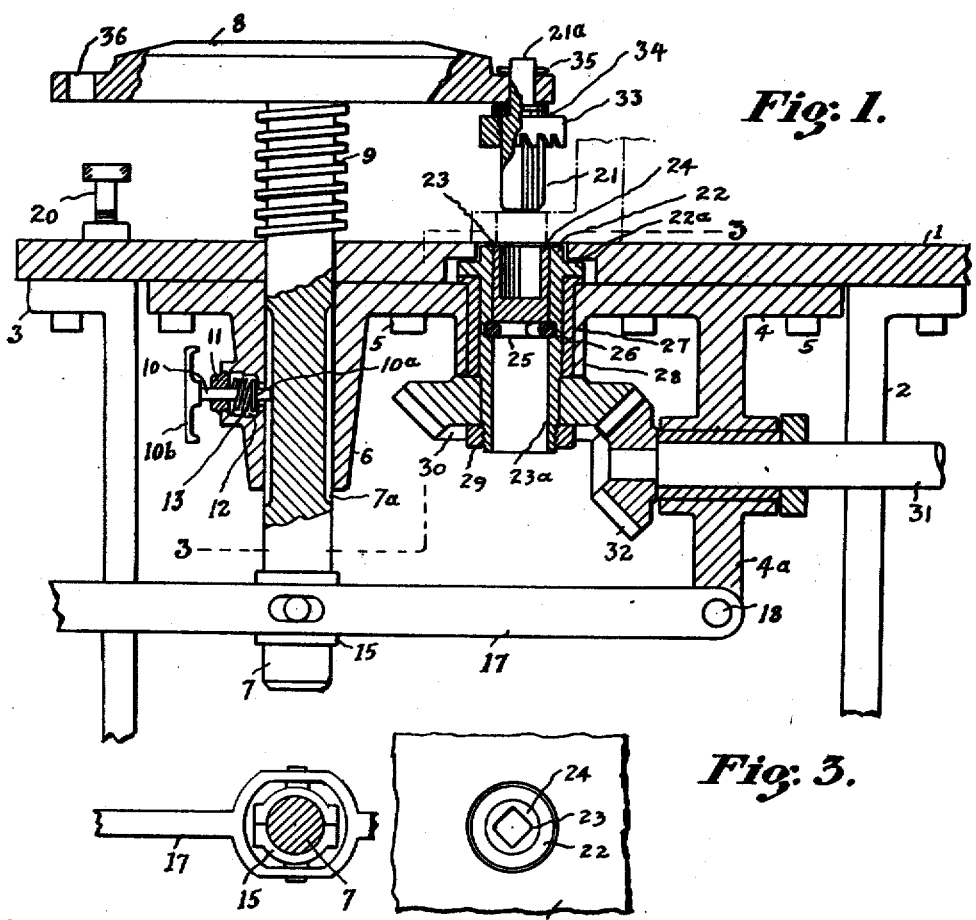
INVENTORS
CLARENCE G. WOOD.
JOHN M. WILSON.
BY Thomas L. Ryan
ATTORNEY.

UNITED STATES PATENT OFFICE.

CLARENCE G. WOOD AND JOHN M. WILSON, OF MUNCIE, INDIANA.

SPOT-FACING MACHINE.

1,318,039.　　　　Specification of Letters Patent.　　Patented Oct. 7, 1919.

Application filed August 26, 1918. Serial No. 251,362.

*To all whom it may concern:*

Be it known that we, CLARENCE G. WOOD and JOHN M. WILSON, citizens of the United States, residing at Muncie, in the county of Delaware and State of Indiana, have invented certain new and useful Improvements in Spot-Facing Machines, of which the following is a specification.

This invention relates to improvements in milling or finishing machines.

In the work of constructing and completing machine parts in readiness to be assembled it is a well established practice to dress or true-up the surface of the metal at all holes where binding bolts are to be used; the purpose being to afford an accurate seating for the heads of the bolts, or for the nuts that may be screwed down on such bolts.

On account of the vast amount of machine production demanded by present-day needs it is obvious that means to facilitate this work of machining or spot-facing would be of immense advantage. Besides cheapening the cost of machine construction there would be the greatly increased speed of production of finished machinery.

The object of the present invention is to provide a machine by which spot-facing may be done accurately, rapidly and economically. More specific purposes of the invention are to provide a machine of the kind described which will be rugged and durable, not liable to get out of repair and which will be economical of manufacture.

The purposes of the invention are accomplished by and the invention is embodied in the new construction, combination and arrangement of parts shown in the accompanying drawings. The invention is described in the following specification and is defined in the appended claims.

In the several views of our improved spot-facing machine, as shown in the drawings, the different parts of the machine are indentified by suitable characters of reference—

Figure 1. is a vertical central sectional view of our spot-facing machine, some of the parts being shown in elevation.

Fig. 2. is a top plan view of a part of the head member, a portion of a flanged work piece being shown by the dotted lines.

Fig. 3. is a top plan view taken on the line 3—3 in Fig. 1.

The substantial work-table plate 1, upon which the object to be spot-faced is disposed, may form a part of the usual frame construction comprising members 2 and 3.

The frame block 4 of the machine and which is secured to the underside of plate 1 by bolts 5, has a centrally bored vertical boss 6. Slidingly disposed in the bore of said boss, is a spindle 7 having the head member 8 of relative diameter as shown. A strong spiral spring 9 having its one end to bear against the underside of the head member and its other end to bear against the plate 1, sustains the head member 8 normally at the raised position shown. The function of the spaced longitudinal grooves 7$^a$ in the spindle 7 will be presently referred to. Means to retain the spindle 7 against rotative movement, but which permits the movement of the spindle vertically, consists of a headed detent 10 slidingly retained in a guide block 11 that is secured in the recess 12 of a lug formed on the side of the boss 6. The inner end of this detent rests slidingly in a hole that extends from the recess 12. The annular lip 10$^a$ has such position on the detent that when the lip is at bearing on the seat of the recess, the nose of the detent is in engagement with the groove 7$^a$. The detent is maintained normally at this engaged position by a spiral spring 13 arranged between the lip of the detent and the inner side of the guide block 11. The outer end of the detent 10 has a handle 10$^b$ by which the operative may pull the detent to retracted position to permit the head member 8 to be shifted.

At the lower portion of the spindle 7 is provided an inset loose divided sleeve 15 upon which is trunnioned an operating lever 17. The fulcrum end of this lever is journaled on a suitable pin 18 carried by a lug 4$^a$ that forms a part of the frame block 4. By depressing the lever 17 the head member 8 is accordingly lowered such distance as is fixed by the height at which the set screw 20 may be adjusted.

Near the peripheral edge of the head plate 8 is loosely supported a member upon which is carried a rigidly secured cutting tool— this said member which we designate herein as a pilot shank 21 is so formed that when carried by the head member 8 to lowered position, it enters and occupies a position of direct co-engagement with a shank block that forms a part of a driving shank 22. The preferred form of construction of this driving shank is that shown in the drawing. The upper portion of the central bore 23 is angular in cross section and constitutes a recess in which an angular shank block or shell 24 is retained. This shank block 24 which has a longitudinal recess of size and contour to receive the pilot shank, is adapted to be inserted through the lower and circular portion 23ª of the driving shank. It is supported at position shown by a divided expansion circlet 25 that is inserted through the bore 23ª and sprung to position in the annular seat 26.

The driving shank 22 which has the annular shoulder 22ª is journaled in a suitable bearing 27 provided in the boss 28. Secured on the lower and shouldered end of the driving shank by a retaining nut 29, is a bevel gear wheel 30.

On the driving shaft 31 which is journaled at proper position as shown, is a gear wheel 32 that meshes with the gear wheel 30.

The circular milling tool 33 is internally threaded and is screwed down on the threaded portion of the pilot shank 21. Between the top of this pilot shank and the underside of the head member 8 is disposed a bearing ring 34. Through the top portion of the stem 21ª of the pilot shank is a cotter pin 35 by which the shank is supported.

Advantages afforded by this invention are that the work of spot-facing may be performed accurately and rapidly and at surfaces otherwise difficult of access; such as locations on flanged cylinders and other flanged motor and machine parts.

It is obvious that by having the cutting tool above the article to be spot faced and capable of being lowered to cutting engagement, and with its shank to make connection with the actuating or driving parts of the machine, there is at once provided a machine by which the work of spot-facing may be performed with accuracy, ease, and speed. Moreover a machine for the purpose described, and constructed in accordance with this invention, will operate with a minimum of friction or strain.

The machine in readiness to be operated appears as shown in the drawings, the head 8 being sustained by the spring 9 at the raised position, there being at all times a clearance underneath the pilot shank 21 sufficient to permit the passing into position of the machine plate, flanged cylinder, or other object-part that is to be spot-faced.

It will be understood that in the "setting up" of the machine, a pilot shank 21 of diameter to freely pass through the hole in the object-part is used.

The object-part being passed to position the operator depresses the lever 17. The length of the pilot shank is such that its end portion having passed through the hole in the object-part, enters the angular recess of the shank block 24 before the face of the ring tool meets the surface of the object-part. As the lever is depressed and the head 8 is lowered, the ring tool 33 comes to engagement with the surface of the object-part. Continued pressure by the operative at the lever 17 causes the tool to quickly face off the metal surface of the object-part. The operative by then lifting the lever raises the tool and pilot shank clear of the object-part. The object-part is then shifted to bring another of its holes to registration with the pilot shank. The operation just described is then repeated.

By the arrangement of a plurality of the openings 36 in the head member 8 it is practicable to have auxiliary or extra pilot shanks fitted with cutting tools of different widths and shapes; thus providing means for a wide range of finishing requirements.

To move the desired pilot shank to operative position, the operator of the machine retracts the detent 10 and swings the head member 8 rotatively, the detent snapping into groove 7ª when the pilot shank comes to registration with the driving shank.

The machine described and illustrated is deemed the preferred form of embodiment of our present invention. We are aware that minor changes may be made in the form, construction and arrangement of the several parts within the range of the invention as defined by the claims without departing from its spirit or sacrificing any of its advantages.

What we claim as our invention and desire to secure by Letters Patent is—

1. The combination of a frame, a head member movable toward and away from the frame, a driving shank journaled in the frame, a pilot shank journaled in the head member and adapted to interlock with the driving shank when the head member is operated, a cutting tool carried by the pilot shank, and means to operate the head member.

2. The combination of a frame, a driving shank journaled in the frame, a head member supported by the frame, a pilot shank journaled in the head member and adapted to interlock with the driving shank when the head member is operated, a spring between the head member and the frame to sustain the former at raised position, a cutting tool carried by the pilot shank, and means to lower the head member.

3. A machine of the kind described, comprising a frame, a head member having its stem journaled slidingly in the frame, a driving shank journaled in the said frame, a pilot shank journaled in the head member and adapted to interlock with the driving shank when lowered into co-engagement with the latter, a cutting tool carried by the pilot shank, a spring to maintain the head member normally at raised position, a means to lower said head member, a power shaft and gearing between the power shaft and the driving shank.

4. A machine of the kind described, comprising a frame, a driving shank journaled in the frame, a head member supported by the frame, a pilot shank journaled in the head member and adapted to interlock with the driving shank when the head member is operated, means to sustain the head member yieldably at raised position, a cutting tool carried by the pilot shank, means to lower the head member, and an adjusting device to vary the distance to which the head member may be lowered.

5. A machine of the kind described, comprising a frame, a driving shank journaled in the frame, a head member, a stem journaled slidingly in the frame and to which said stem the head member is secured, there being spaced longitudinal grooves in the said stem, a plurality of openings in the peripheral portion of the head member, a pilot shank journaled in one of said openings and adapted to interlock with the driving shank when shifted into co-engagement with the driving shank, a cutting tool carried by the pilot shank, a spring to maintain the head member normally at raised position, a means to lower the said head member, a detent to engage one of the grooves of the head-member stem to retain the stem against rotative movement, a power shaft, and power transmitting connections between the power shaft and the said driving shank.

In testimony whereof we affix our signatures.

CLARENCE G. WOOD.
JOHN M. WILSON.

Copies of this patent may be obtained for five cents each, by addressing the "Commissioner of Patents, Washington, D. C."